US010345161B2

(12) United States Patent
Caltabiano et al.

(10) Patent No.: US 10,345,161 B2
(45) Date of Patent: Jul. 9, 2019

(54) MINIATURIZED LOAD SENSOR DEVICE HAVING LOW SENSITIVITY TO THERMO-MECHANICAL PACKAGING STRESS, IN PARTICULAR FORCE AND PRESSURE SENSOR

(71) Applicant: STMicroelectronics S.r.l., Agrate Brianza (IT)

(72) Inventors: Daniele Caltabiano, Agrate Brianza (IT); Mohammad Abbasi Gavarti, Milan (IT); Bruno Murari, Monza (IT); Roberto Brioschi, Sesto San Giovanni (IT); Domenico Giusti, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/464,869

(22) Filed: Mar. 21, 2017

(65) Prior Publication Data
US 2017/0343430 A1 Nov. 30, 2017

(30) Foreign Application Priority Data
May 31, 2016 (IT) .......................... 102016000056318

(51) Int. Cl.
*G01L 1/18* (2006.01)
*G01L 9/00* (2006.01)
*G01L 1/04* (2006.01)
(52) U.S. Cl.
CPC ................ *G01L 1/18* (2013.01); *G01L 1/04* (2013.01); *G01L 9/0041* (2013.01)

(58) Field of Classification Search
CPC ................ B81B 3/00; G01L 1/18; G01L 1/04
See application file for complete search history.

(56) References Cited

U.S. PATENT DOCUMENTS 5,287,757 A    2/1994   Polaert et al.
8,575,710 B2   11/2013   Villa et al.
(Continued)

FOREIGN PATENT DOCUMENTS

CN          104145240 A      11/2014
EP           0286867 A1 *   10/1988           G10L 19/147
(Continued)

OTHER PUBLICATIONS

IT Search Report and Written Opinion for IT Appl. No. 102016000056318 dated Jan. 17, 2017 (8 pages).
(Continued)

*Primary Examiner* — Jamel E Williams
(74) *Attorney, Agent, or Firm* — Crowe & Dunlevy

(57) ABSTRACT

A load-sensing device is arranged in a package forming a chamber. The package has a deformable substrate configured, in use, to be deformed by an external force. A sensor unit is positioned in direct contact with the deformable substrate and is configured to detect deformations of the deformable substrate. An elastic element within of the chamber is arranged to act between the package and the sensor unit to generate, on the sensor unit, a force keeping the sensor unit in contact with the deformable substrate. The deformable substrate may be a base of the package, and the elastic element may be a metal lamina arranged between the lid of the package and the sensor unit. The sensor unit may be a semiconductor die integrating piezoresistors.

37 Claims, 7 Drawing Sheets

(56) References Cited

U.S. PATENT DOCUMENTS 8,878,313 B2 11/2014 Salmaso
2013/0234734 A1* 9/2013 Iida .................... G06F 3/044
 324/661

FOREIGN PATENT DOCUMENTS

JP 2011100215 A * 5/2011
JP 2011100215 A 5/2011
JP 2016217804 A * 12/2016 ............... B81C 3/00

OTHER PUBLICATIONS

First Office Action and Search Report from co-pending CN Appl. No. 201611259939.5 dated Oct. 26, 2018 (7 pages).

* cited by examiner

MINIATURIZED LOAD SENSOR DEVICE HAVING LOW SENSITIVITY TO THERMO-MECHANICAL PACKAGING STRESS, IN PARTICULAR FORCE AND PRESSURE SENSOR

PRIORITY CLAIM

This application claims the priority benefit of Italian Patent Application No. 102016000056318, filed on May 31, 2016, the content of which is hereby incorporated by reference in its entirety to the maximum extent allowable by law.

TECHNICAL FIELD

The present invention relates to a miniaturized load sensor device having low sensitivity to thermo-mechanical packaging stress, in particular a force and pressure sensor.

BACKGROUND

As is known, the techniques of micromachining semiconductor devices enable manufacture of micromechanical structures within layers, generally of semiconductor material, deposited (for example, a polycrystalline silicon layer) or grown (for example, an epitaxial layer) on sacrificial layers, which are then removed via etching.

For example, Micro-Electro-Mechanical System (MEMS) force or pressure sensor devices are known, comprising at least one flexible membrane integrated in or on a die of semiconductor material and whose bending, as caused by the action of external forces, is measured. The measurement may be of a piezoresistive type, and to this end piezoresistors are integrated in or on the membrane, or of a capacitive type, and to this end the membrane is capacitively coupled to another conductive region of the die. In either case, the variation of electrical signal resulting from deflection of the membrane is measured.

Microintegrated sensors generally have containers or packages for protecting the internal structures of the sensor from the external environment, for example in order to reduce disturbance due to temperature and humidity, and to the presence of particles which prevent their operation or worsen the performance thereof. The package also has the function of increasing the mechanical strength of the device.

In MEMS devices, manufacture of the package and its presence may cause stresses that adversely affect the performance, stability, and reliability of the sensor.

This is particularly disadvantageous for load sensors, which are, for example, based upon the piezoresistive characteristics of silicon, where the stresses are directly involved in the transduction mechanism. Thus, currently, in these cases, design of the device is aimed at limiting the effects of stress caused by the package and by the assembly process, for example with an accurate choice of the used materials and taking into account effects that arise during mechanical coupling between the sensor and the package.

The undesirable effects become increasingly important as the dimensions of the dice and of the packages increase and limit the use of 3D packaging techniques. For example, in pressure and force sensors, simple techniques of packaging by moulding, commonly employed in microelectronics, are not used since they generate high stresses during resin injection and cooling.

Further, undesirable deformations may arise also as a result of operating temperatures and material ageing.

In fact, the material of the package (typically plastic or metal) generally has a thermal expansion coefficient that differs considerably from that of the material of the structure (monocrystalline or polycrystalline silicon or ceramic).

The soldering processes or the temperature variations may thus bring about different deformations in the package and in the sensor element, which may cause thermo-mechanical stresses and strains (for example, according to the phenomenon known as "die warpage"), which cause measurement errors and drifts. These errors also vary according to the production lot, and at times even between sensors belonging to a same production lot, and are variable over time.

In order to eliminate these measurement errors, in the past a wide range of solutions have been proposed.

For example, various solutions of low-stress packages have been proposed and adopted. In some of these, the package also comprises mechanical structures for decoupling the sensor from the surrounding environment. However, these solutions do not solve the problem completely.

Other solutions envisage an electronic compensation of the thermal drifts of the measures supplied by the micromechanical structure via appropriate electronic components in the reading interface associated to the structure, for example an ASIC (Application-Specific Integrated Circuit).

A known solution of this type uses a temperature sensor in the reading electronics associated to the micromechanical structure. If the temperature is known, the drifts of the system are electronically compensated by resorting to compensation curves previously obtained via appropriate calibration and/or simulation procedures.

Solutions of this kind are, however, burdensome, in so far as they require costly and delicate measurement procedures to obtain compensation curves that accurately map the thermal drifts of the sensors, and appropriate compensation operations. Further, in general, the obtainable precision is not altogether satisfactory and repeatable.

Other proposed solutions thus provide for an integrated compensation of the thermo-mechanical deformations, by introducing structural compensation elements in the micromechanical structure. Also these solutions are unable to solve the problem satisfactorily.

There is a need in the art to provide a load sensor that overcomes the drawbacks of the prior art.

SUMMARY

In an embodiment, a load-sensing device is provided that detects a load (where by this term is meant a force, a pressure, or a torque), indirectly by detecting the deformation of a deformable substrate on which the load acts. A sensor unit is kept in contact with the deformable substrate through elastic or viscoelastic elements.

The deformable substrate may be part of a package that protects the sensor unit or be arranged therein. The sensor unit may be a semiconductor material die or a membrane of ceramic or other similar material, which is able to bend and undergo deformation together with the deformable substrate and has sensor elements, such as piezoresistors connected in Wheatstone-bridge configuration. The sensor unit is kept elastically in contact with the deformable substrate by the elastic element, arranged between the sensor unit and an inner wall of the package.

The device may operate also as indirect sensor for detecting other physical quantities, such as motion, exploiting the deformation of parts and the forces associated to this deformation.

BRIEF DESCRIPTION OF THE DRAWINGS

For a better understanding of the present invention, preferred embodiments thereof are now described, purely by way of non-limiting example, with reference to the attached drawings, wherein.

DETAILED DESCRIPTION OF THE DRAWINGS

Figure 1:
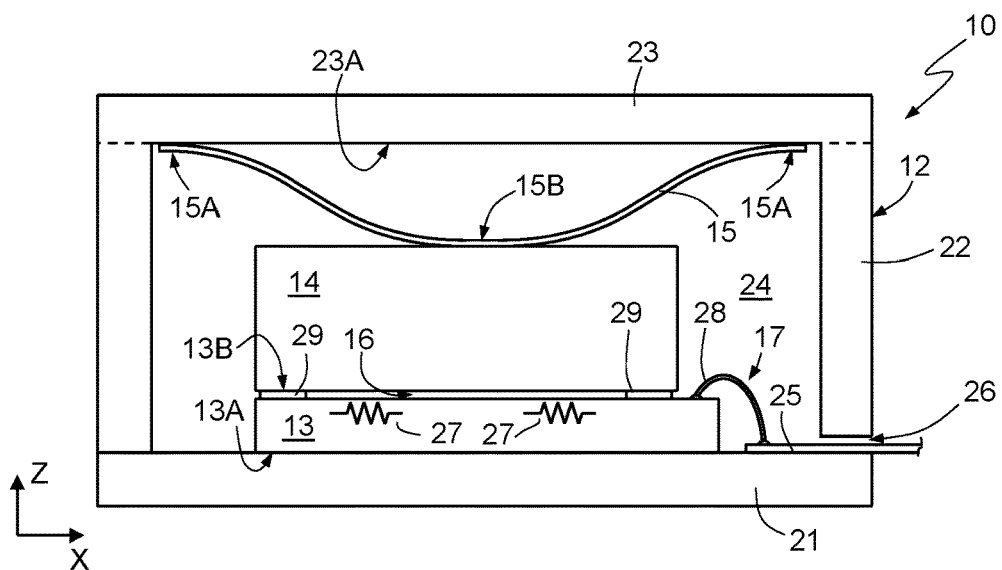
FIG. 1 is a cross-section of one embodiment of the present device.
Figure 2:
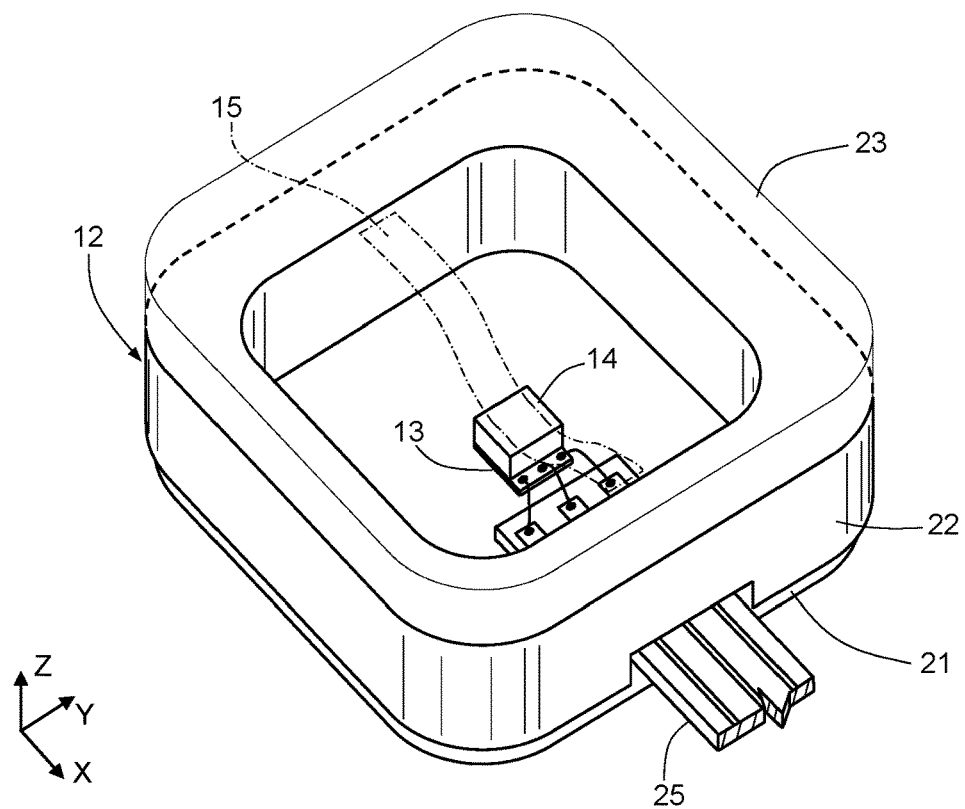
FIG. 2 is a perspective view, with ghost parts, of the device of FIG. 1.
Figure 3:
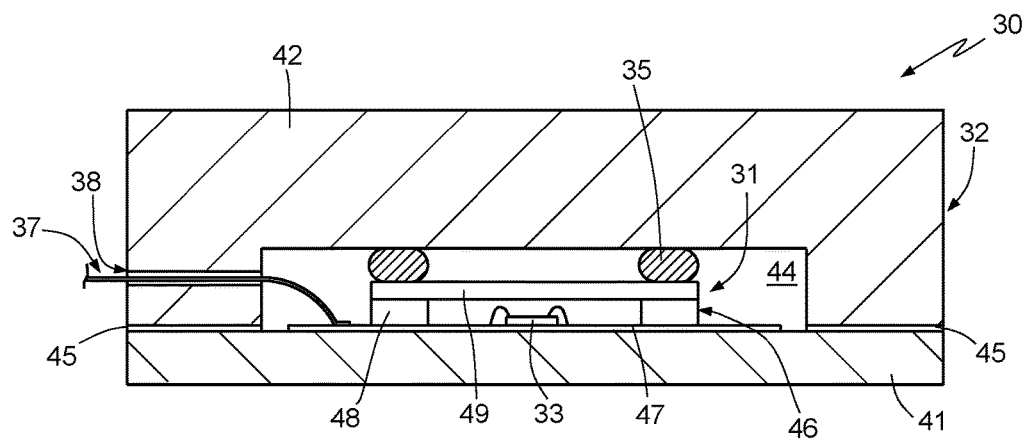
FIGS. 3 and 4 are cross-sections of different embodiments of the present device.
Figure 4:
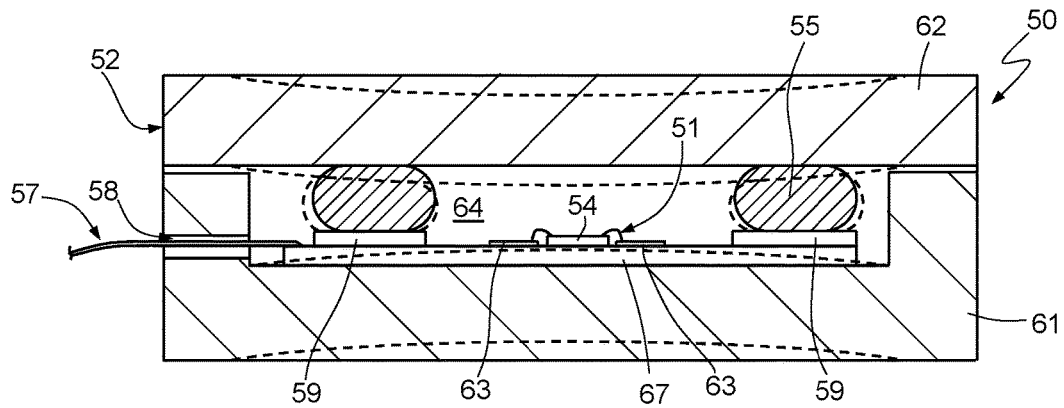

In the attached figures, similar elements are designated in the various figures starting from the numbering used for the embodiment of FIGS. 1 and 2 and increasing each time by 20. Consequently, the device of FIG. 1 is designated as a whole by 10, and the device of FIG. 3 is designated by 30; the device of FIG. 4 is designated by 50, and so on. The same applies to the various parts of the device.

FIGS. 1 and 2 show a device 10 forming a load sensor, and precisely a pressure sensor, a force sensor, and a torque sensor. The device 10 comprises a package 12 surrounding a sensor die 13. A cap 14 is bonded over the sensor die 13 so as to form a gap 16 in between, and an elastic element 15, arranged between the cap 14 and the package 12, keeps the sensor die 13 in position, as explained in detail hereinafter. The sensor die 13 is electrically connected to the outside through electrical connections 17.

The package 12 comprises a base 21, side walls 22, and a lid 23, forming as a whole a substantially hollow parallelepipedal shape, which delimits a chamber 24. The chamber 24 has a surface 23A, here formed by the inner side of the lid 23, which acts as a contrast element for the elastic element 15. The package 12 may be of any suitable material, for example metal or ceramic, in a per se known manner. The various parts may even be of materials different from one another.

The base 21 of the package 12 supports the sensor die 13 and is in direct contact therewith. The base 21 thus defines a deformable substrate the deformation whereof is measured by the sensor die 13. The base 21 may carry conductive lines 25, for example paths printed on a flexible substrate or on the base 21, wires, a flexible strip incorporating conductors, and the like, extending over the base 21 and through one or more openings 26 in the side walls 22, towards the outside of the device 1.

The side walls 22 and the lid 23 may be made as a single piece, for example via moulding or forging, or may be formed by separate parts, bonded together by gluing or soldering. The side walls 22 are typically bonded to the base 21, but may be made a single piece therewith, analogously to the above, if the lid 23 is a separate element from the side walls 22. Bonding of the side walls 22 to at least one region between the base 21 and the lid 23 may be obtained via bonding regions (not shown), for example using glass frit, or some other type of glue, preferably of an elastic type, able to withstand the load of the elastic element 15. Further, the side walls 22 may also be connected to at least one between the base 21 and the lid 23 by a joint, so as to ensure bonding over time.

The sensor die 13, within the chamber 24, is a semiconductor material die, for example of silicon, having a parallelepipedal shape with a first face 13A, in direct contact with the base 21, and a second face 13B, bonded to the cap 14.

The sensor die 13 is configured to indirectly detect forces acting on the package 12. For example, the sensor die 13 may be manufactured as described in U.S. Pat. No. 8,575,710 (incorporated by reference). To this end, the sensor die 13 has a small thickness, for example 100 μm, so as to easily deform and bend, as explained in greater detail hereinafter. Further, it integrates sensor elements detecting deformation of the sensor die 13. For example, in proximity of its second face 13B, in a known manner, shown only schematically, the sensor die 13 accommodates piezoresistors 27 represented only schematically and connected together in a Wheatstone-bridge configuration, in a per se known manner. The sensor die 13 may accommodate also further integrated processing components (not shown).

The piezoresistors 27 and possible further components are coupled to the outside through contact pads (not visible), arranged on its second face 13B and connected via wires 28 to the conductive lines 25. The contact pads (not visible), the wires 28, and the conductive lines 25 form the electrical connections 17.

The cap 14 is formed by a substantially rigid body, for example of a parallelepipedal shape. The cap 14 may also be formed by a die of semiconductor material, typically a non-processed die, having a greater thickness than the die 13 so as to be able to withstand the load of the elastic element 15, preferably without deforming. For example, the cap 14 may have a depth of approximately 300 μm. Further, in the embodiment shown, the cap 14 has a smaller area than the sensor die 13. For example, the sensor die 13 may have a length (in direction of the X axis of FIG. 2) of approximately 660 μm, and the cap 14 may have a length, in the direction X, of approximately 510 μm, so that the contact pads (not visible) are accessible for electrical connection by the wires 28. The sensor die 13 and the cap 14 may have widths (in the direction of Y axis of FIG. 2) that are the same, for example 600 μm. Alternatively, the sensor die 13 and the cap 14 may have the same width and length, and part of the cap 14 may be removed to free the contact pads (not visible) and enable electrical connection.

The cap 14 is bonded to the sensor die 13 via a soldering or gluing layer 29, for example of glass frit, of an annular, quadrangular shape and forms a spacer, laterally delimiting the gap 16 between the cap 14 and the sensor die 13. The thickness of the gluing layer 29, corresponding to the depth of the gap 16, determines in practice the maximum deflection of the sensor die 13 and thus the full-scale thereof. For example, the gluing layer 29 may have a thickness of 10 μm.

The sensor die 13 and the cap 14 thus form a sensor unit 11,

The elastic element 15 is here formed by a bending spring, and more precisely a leaf spring, in the form of an arched strip, having two ends 15A and a central area 15B. The leaf spring 15 is made, for example, of steel, such as spring steel, and is sized so as to rest with its ends 15A against the surface 23A of the lid 23 and, with its central area 15B, against the top side of the cap 14. Alternatively, as the elastic element, it is possible to also use a disk-shaped cup spring, having a convexity facing the cap 14 and a cross-section similar to the one visible in FIG. 1.

In this way, the leaf spring 15 holds the sensor die 13, through the cap 14, in position, in direct contact against the base 21. Consequently, external forces and loads to be measured, acting on the base 21 and causing deformation of the base 21, are transferred onto the sensor die 13, which warps accordingly. Deformation of the sensor die 13 is detected in a known way by the piezoresistors 27, which generate corresponding electrical signals supplied to the outside via the electrical connections 17.

On the other hand, no foreign material is present between the sensor die 13 and the base 21, that might generate spurious stresses, variable in time and with temperature, and thus falsify the measurements.

In particular, studies made by the Applicant have shown that the elastic bonding of the sensor die 13 enables a high stability to be obtained in the external signals, as shown Table I provided hereinafter. In detail, Table I shows the results of simulations carried out by applying different loads (external force F, expressed in bar) on the base 21, where S0(20), S0(120) are the output voltages detected in a sensor die S0 bonded via a glue layer in a known package at 20° C. and 120° C., respectively; and S1(20), S1(120) are the output voltages detected in a sensor die S1 that is the same as the die S0, but packaged as shown in FIGS. 1 and 2, at 20° C. and 120° C., respectively (expressed in mV/V).

| F | S0(20) | S0(120) | S1(20) | S1(120) |
|---|--------|---------|--------|---------|
| 125 | 4 | 1 | 2.6 | 2.5 |
| 250 | 7.1 | 4.3 | 5.1 | 5 |
| 375 | 10 | 7.2 | 7.7 | 7.5 |
| 500 | 13 | 10 | 10.2 | 10 |

As may be noted, the output of the sensor die S1 is considerably more stable in temperature than that of the sensor die S0.

Other simulations made by the Applicant have shown that the sensor die 13 exactly follows the deflection of the base 21 in the vertical direction Z (perpendicular to the plane of the first face 13A of the sensor die 13 in an undeformed condition), but is uncoupled from the base 21 in the lateral direction, in X or Y direction (parallel to the plane of the first face 13A of the sensor die 13 in the undeformed condition). The sensor die 13 may thus expand laterally, independently of the base 21, as a result of the load applied or of temperature. Consequently, any possible different coefficients of thermal expansion or any possible different deformations in the lateral direction between the sensor die 13 and the base 21 do not generate measurable stresses which could jeopardize reading of forces applied in a direction perpendicular to the base 21.

FIG. 3 shows a device 30 comprising a sensor unit 31 kept in contact with a base 41 of a package 32 by an elastic ring 35 of an O-ring type of viscoelastic material, for example rubber.

The package 32 is, for example, of metal and comprises a cup-shaped lid 42, bonded to the base 41 through adhesive material 45. It is also possible to provide means for mutual restraining the base 41 and the lid 42 (not shown). The lid 42 defines a chamber 44 accommodating the sensor unit 31. The lid 42 may have a cylindrical shape, with an external diameter of 3 mm and a diameter of the chamber 44 of 2 mm and further has a slit 38 for passage of electrical connections 37.

The sensor unit 31 here comprises a ceramic casing 46 housing a sensor die 33. In detail, the ceramic casing 46 comprises a membrane 47, a spacer 48, and a covering plate 49, all of ceramic and bonded together. The membrane 47 typically has a small thickness, for example 100 µm, so as to be able to warp together with the base 41. The sensor die 33 is here soldered to the membrane 47, for example via an appropriate metal alloy (soft solder), for instance SnAg, of a type commonly used for soldering electronic components. In this way, since ceramic and silicon have similar coefficients of thermal expansion and are soldered using appropriate material, the sensor die 33 and the membrane 47 behave as a monolithic body for the purposes of detection of loads.

The elastic ring 35 here elastically presses the sensor unit 31 directly into contact with the base 41 of the package 32. In this way, the base 41 and the membrane 47 undergo the same deflection, enabling optimal transmission of forces and loads acting in a perpendicular direction on the base 41, to the sensor unit 31. Matching between the membrane 47, of ceramic, and the sensor die 33, of silicon, which as said are materials that have similar coefficients of thermal expansion, ensures an excellent and constant transmission of the stresses and a high sensitivity of the device 30, up to values of force in the region of 30 kN.

FIG. 4 shows a device 50 where a sensor unit 51 is kept in contact with a base 61 of a package 52 once again via an elastic ring 55. In the device 50, the sensor unit 51 comprises a membrane 67, for example of ceramic, on which piezoresistors 63, for example screen-printed resistors, are formed, connected to an electronic processing circuit 54, for example an ASIC, attached to the membrane 67. A contrast element 59 is also attached on the membrane 67 and the elastic ring 55 rests on the contrast element 59. The contrast element 59 may be of ceramic or other rigid and not easily compressible material. In this embodiment, the sensor unit 51 is without inner casing.

Also here, the package 52 may have a cylindrical shape, with a slit 58 for passing electrical connections 57. In FIG. 4, further, the base 61 is cup-shaped and also forms the side walls delimiting, together with the lid 62, a chamber 64 housing the sensor unit 51.

Also in the embodiment of FIG. 4, the membrane 67 is kept in contact with the base 61 by the elastic ring 55. The piezoresistors 63, formed directly on the membrane 67, may thus detect bending thereof, caused by a similar bending of the base 61 and due to forces acting from outside. Also in this case, the device 50 is able to detect external forces of up to 30 kN.

Figure 5:
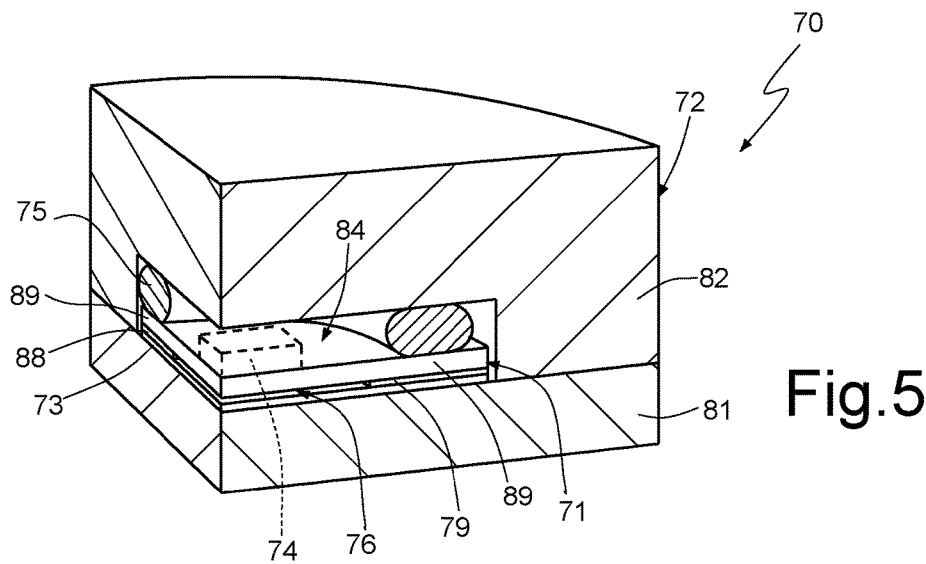
FIG. 5 is a perspective cross-section view of a portion of another embodiment of the present device.

FIG. 5 shows a device 70 having a sensor unit 71, a package 72 comprising a base 81 and a lid 82, the latter being cup-shaped so as to delimit, with the base 81, a chamber 84.

The sensor unit 71 here comprises a sensor die 73, a bonding region 88, and a contrast plate 89, housed in the chamber 84 together with an elastic ring 75.

In detail, the sensor die 73 directly rests on the base 81 and is here formed as a ceramic die, including piezoresistors (not shown), for example of the type manufactured by Microtel, or as described in U.S. Pat. No. 8,878,313 (incorporated by reference).

The bonding region 88, for example of glass frit, here has an annular shape and acts as a spacer that forms, with the overlying contrast plate 89, a gap 76.

The contrast plate 89 is also of ceramic and may have the shape of a complete disk (as in the embodiment shown) or just an annular shape.

An electronic signal processing circuit (for example, an ASIC 74) may be bonded to the contrast plate 89 and be connected to the sensor die 73 and to the outside, by electrical connections (not shown).

The sensor die 73 has contacts (not shown) passing through the bonding region 88 and the contrast plate 89, as far as the ASIC 74.

Similarly to the previous solutions, the elastic ring 75 presses the sensor die 73 against the base 81, through the contrast plate 89 and the bonding region 88, enabling the sensor die 73 to detect any possible deflection of the base 81. Consequently, also the device 70 is able to detect external forces of up to 30 kN.

Figure 6:
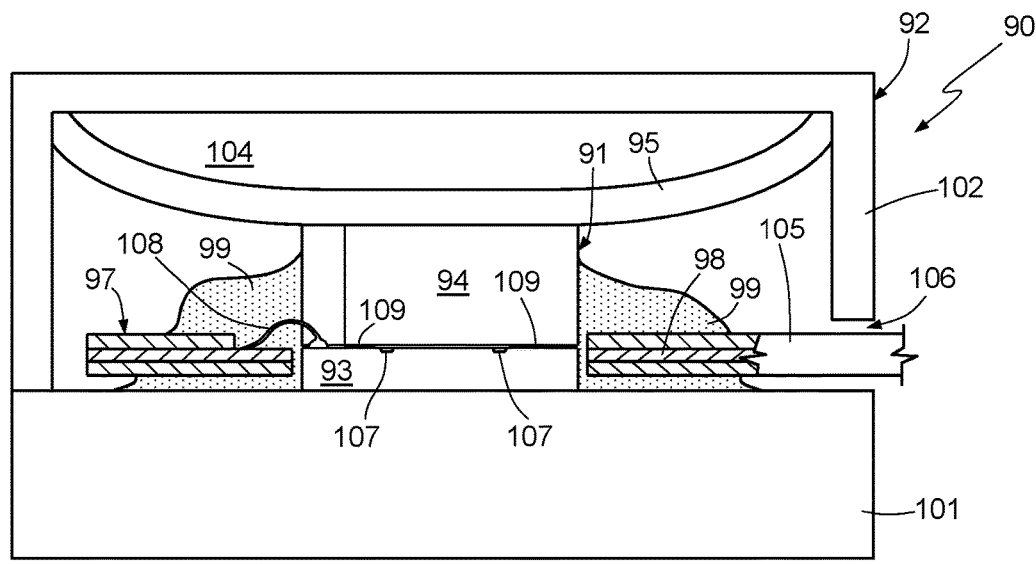
FIG. 6 is a cross-section view of a different embodiment of the present device.

FIG. 6 shows an embodiment of the device 90 similar to that of FIGS. 1 and 2, wherein the cap, here designated by 94, is bonded to the sensor die, here designated by 93, via bonding regions 109, to form a sensor unit 91. A leaf spring 95 presses the sensor die 93 via the cap 94 towards the base 101 of the package 92. A gel mass 99 surrounds the sensor die 93, part of the cap 94, and part of the electrical connections 97. Here the piezoresistors are designated by reference 107.

The gel mass 99 may be of the material commonly referred to as "glob top" in the semiconductor industry or a softer material, such as a silicone gel, so as not to cause stresses.

The electrical connections 97 here comprise bonding wires 108 and a conductive structure 105 formed by a flexible region, for example of kapton, housing electrical conductors, for example of copper. The connection structure 105 extends from the chamber 104 of the package 92 through an opening 106 in the lid 102, here of metal and cup-shaped.

In this embodiment, the gel mass 99 contributes to hold the sensor die 93 in the correct position, in contact with the base 101 of the package 92. It further bonds the electrical connections 97 to the base 101.

Figure 7:
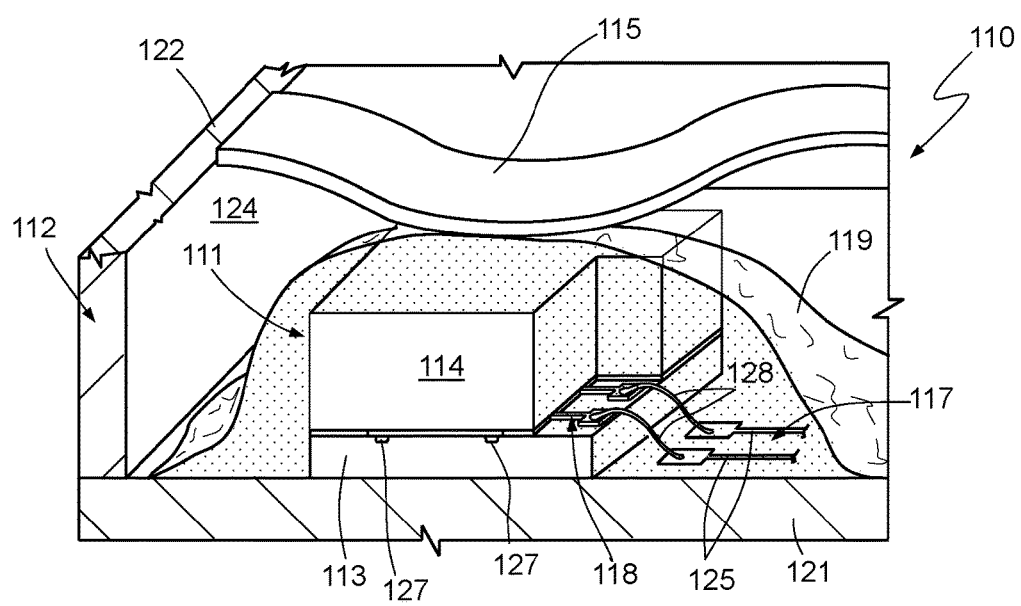
FIG. 7 is a perspective cross-section view of a different embodiment of the present device.

FIG. 7 shows an embodiment similar to that of FIG. 6, wherein a viscous mass 119, for example of gel, completely surrounds the sensor die 113 and the cap 114, as well as the portion of the electrical connections 117 arranged in the chamber 124 of the device 110. The viscous mass 119 thus covers contact pads 118 formed on the top surface of the sensor die 113, the wires 128, and part of the conductive lines 125 of the electrical interconnections 117.

Here, the elastic element is formed by a leaf spring 115, for example an arched steel strip, arranged on the viscous mass 119 and pressing the sensor die 113, through the viscous mass 119 and the cap 114, against the base 121 of the package 112. In practice, during manufacture, after arranging the sensor unit 111 on the base 121 of the package 112 and forming the electrical connections 117, the viscous mass 119 is poured in liquid or semi-liquid form, then the leaf spring 115 is arranged, and finally the lid 122 is soldered.

The viscous mass 119 may be formed by silicone and, in addition to holding the sensor die 113 in position in contact with the base 121, it protects the sensor unit 111 from contact with the leaf spring 115.

In this way, the life of the sensor unit 111 is lengthened, by reducing the risk of crack nucleation in the contact point between the leaf spring 115 and the sensor unit 111. Further, with this embodiment, no risk of erosion for the sensor unit 111 or for the leaf spring 115 exists.

Figure 8:
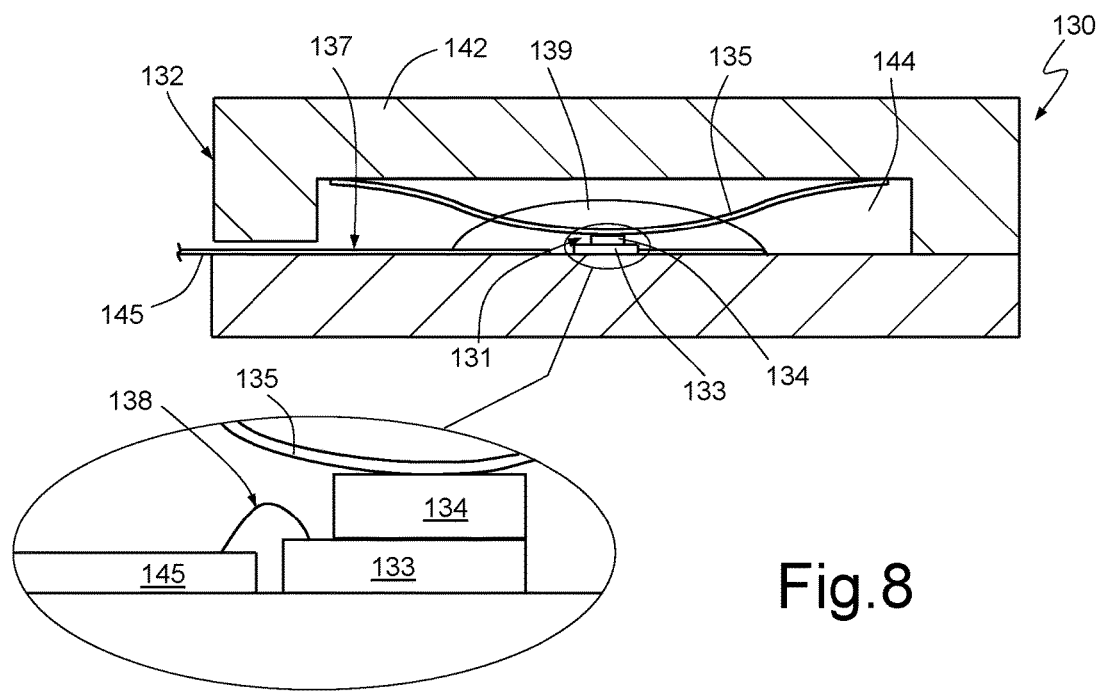
FIGS. 8-10 are cross-sections of other embodiments of the present device.

FIG. 8 shows a device 130 similar to the device 110 of FIG. 7, where a viscous mass 139, also here of gel, envelops also part of the leaf spring 135. In this case, during manufacture, after arranging the sensor unit 131 on the base 141 of the package 132 and forming the electrical connections 137 (for example, via plate 145 and wires 140 with a metal such as gold), the leaf spring 115 is positioned to rest on the sensor unit 131, and then the viscous mass 139 is poured, finally, the lid 142 is soldered.

Figure 9:
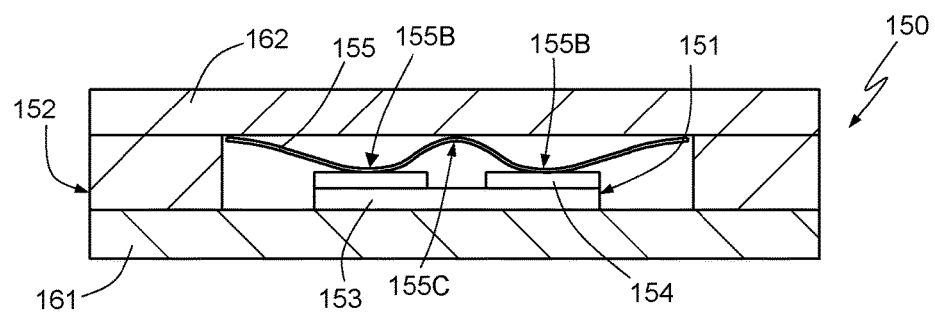

FIG. 9 shows a device 150 similar to the device 10 of FIG. 1, wherein the elastic element, here once again a strip-shaped leaf spring 155, has a number of contact points with the sensor unit 151. In particular, in the example shown, the leaf spring 155 forms a series of depressions, here two depressions 155B, in contact with the sensor unit 151, connected by upwards projecting portions, here one projecting portion 155C, which may be in contact or not with the lid 162 of the package 152.

The cap 154 may be obtained from a single body with quadrangular area, as in FIG. 1, or be formed by a contrast ring (as shown in FIG. 9, which represents, in cross-section, two portions) or be formed by a plurality of separate contrast portions, as many as the contact points.

Also in this solution, a viscous mass (not shown) may be provided.

This solution may prove useful when the sensor unit 151 or the sensor die 153 are very large, of dimensions comparable with those of the package 152 (the latter, for example, being of the order of 10 mm×10 mm). In this case, the presence of different contact points improves the quality of the contact surface between the base 161 and the sensor die 153, since the action of the leaf spring 155 is applied to various contact points. In this way, it is further possible to increase the sensitivity of the system, since a thinner and longer sensor die 153 may be used.

Figure 10:
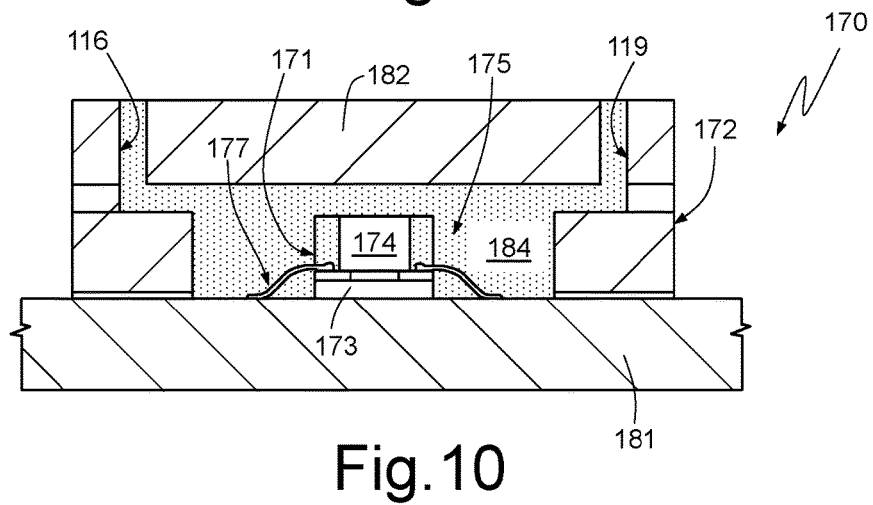

FIG. 10 shows a device 170 wherein the elastic element is formed by a viscous mass 175 that fills the entire chamber 184 and holds the sensor unit 171 in contact with the base 181 of the package 172.

The viscous mass 175 may be, for example, of silicone rubber, poured in liquid phase into the chamber 184 after closing of the package 172, through an appropriate first opening 116, for example in the lid 182. A second opening 119, for example also made in the lid 182, may be provided for suctioning air from the chamber 184 during injection of the viscous mass 175.

In FIG. 10, the sensor unit 171 is of the type shown in FIGS. 1 and 2, but could also be that of any of FIGS. 3-5.

In this embodiment, the viscous mass 175 is particularly effective in favoring adhesion of the sensor unit 171 to the base 181 of the package 172, and thus in enabling the sensor unit 171 to follow the deflection of the base 181 when a load is applied thereon. Further, the assembly is particularly simple and inexpensive.

Figure 11:
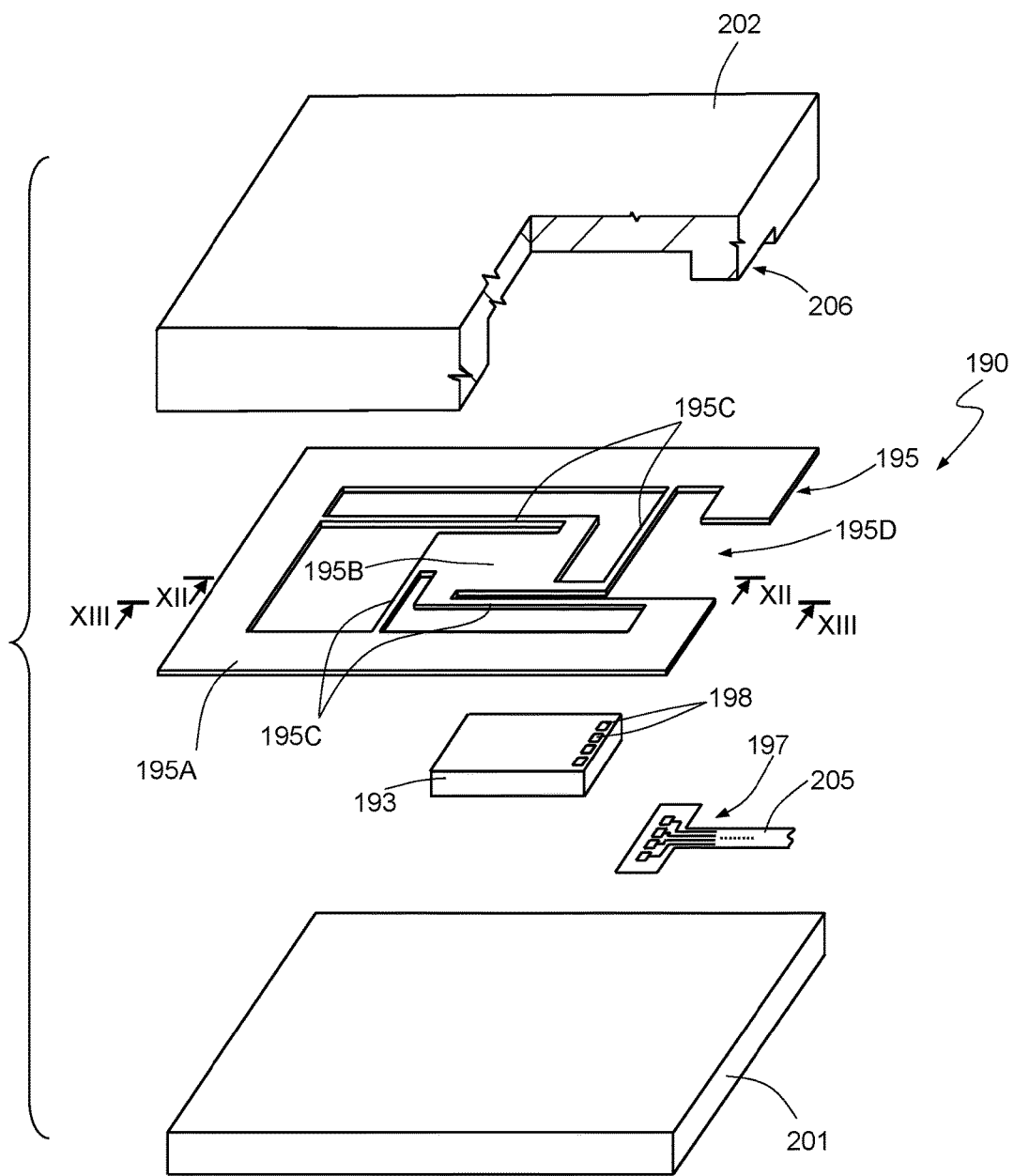
FIG. 11 is an exploded perspective view of yet another embodiment of the present device.
Figure 12:
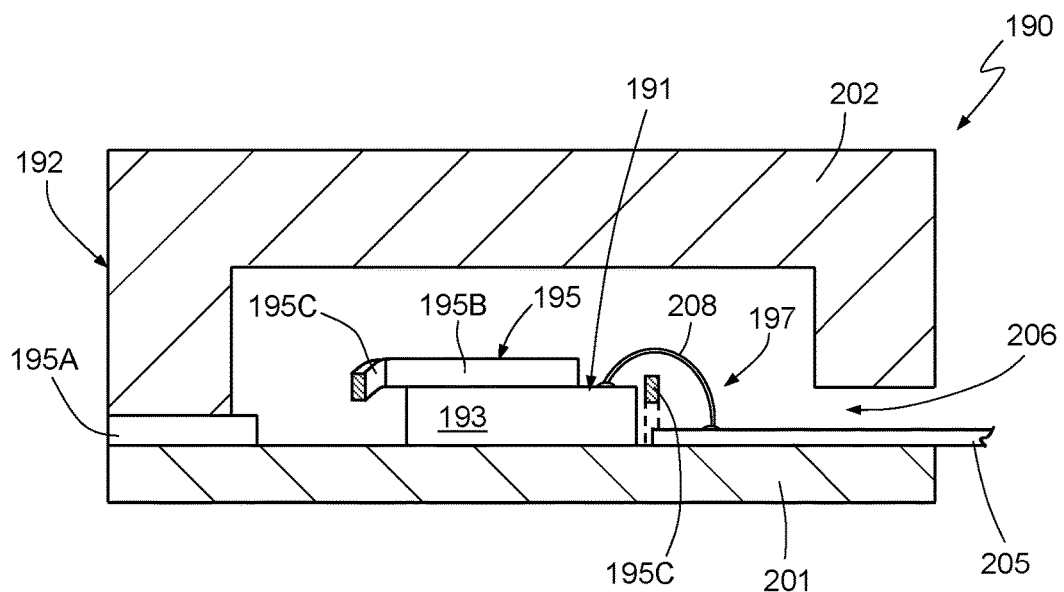
FIGS. 12 and 13 show cross-sections taken along the section lines XII-XII and XIII-XIII, respectively, of FIG. 11.
Figure 13:
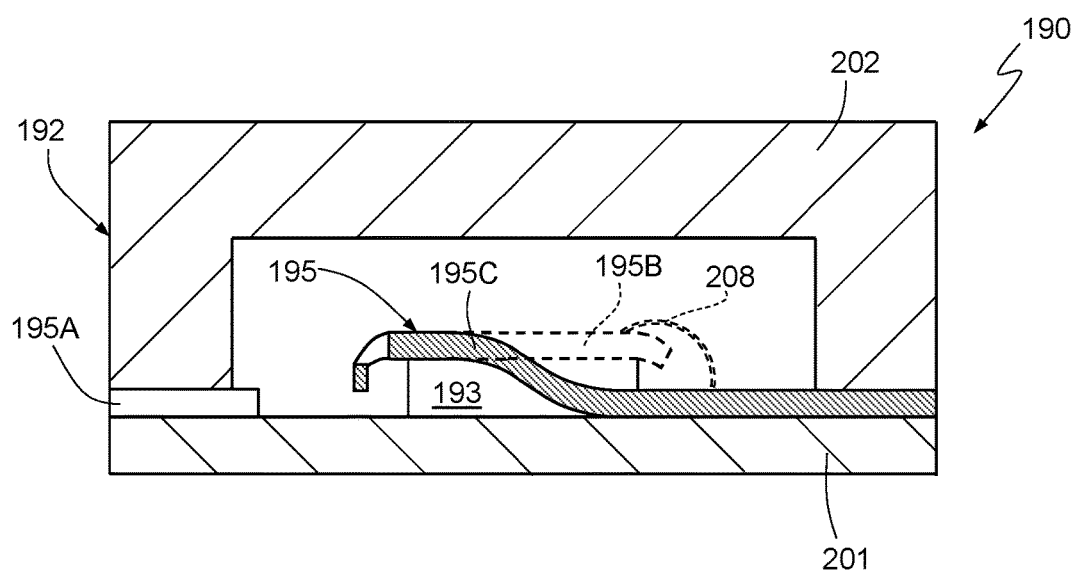

FIGS. 11-13 show a device 190 wherein the elastic element is formed by a shaped metal lamina 195. For example, the shaped metal lamina may be formed by a laser-cut, spring steel lamina with a thickness of 0.2 mm.

In detail, the shaped metal lamina 195 comprises an outer frame 195A, a central portion 195B, and a plurality of arms 195C, extending between the outer frame 195A and the central portion 195B. In the embodiment shown, the outer frame 195A has an open annular rectangular shape, with an outer perimeter approximately equal to the outer perimeter of the lid 202, here cup-shaped, and is bonded between the lid 202 and the base 201. The outer frame 195A further has an opening 195D corresponding to the opening 206 of the lid 202.

The central portion 195B of the shaped metal lamina 195 here has a substantially rectangular shape. The arms 195C, here four arms 195C, are L-shaped and each extend from a different side of the outer frame 195A as far as a respective side or edge of the central portion 195B.

The central portion 195A of the shaped metal lamina 195 rests on the sensor unit 191, here comprising, for example, just the sensor die 193, and has dimensions such as to cover practically the entire area of the sensor die 193 expect for a portion where the contact pads 198 are formed to enable access thereto and bonding to bonding wires 208 (FIG. 12).

The electrical connections 197 here comprise a flexible conductor 205 including a strip of flexible material, for example kapton, accommodating electrical conductors, for example of copper, similarly to what shown in FIG. 2, connected to the bonding wires 208. The flexible conductor 205 extends on the base 201 and through the openings 206 in the lid 202 and 195D in the outer frame 195 of the shaped elastic lamina 195.

During assembly, the shaped elastic lamina 195 is arranged on the sensor die 193, with the central portion 195B in contact therewith. Bonding of the lid 202 thus causes deformation of the arms 195C (which are easily deformable because of their small width, for example, 100 μm), as a result of the thickness of the sensor unit 191, as may be noted in particular from FIGS. 12 and 13. The shaped elastic lamina 195 may be bonded to the base 201 and to the lid 202 via soldering spots and holds the sensor unit 191 in contact with the base 201, enabling mutual coupling and measurement of the forces acting on the base 201.

Figure 14:
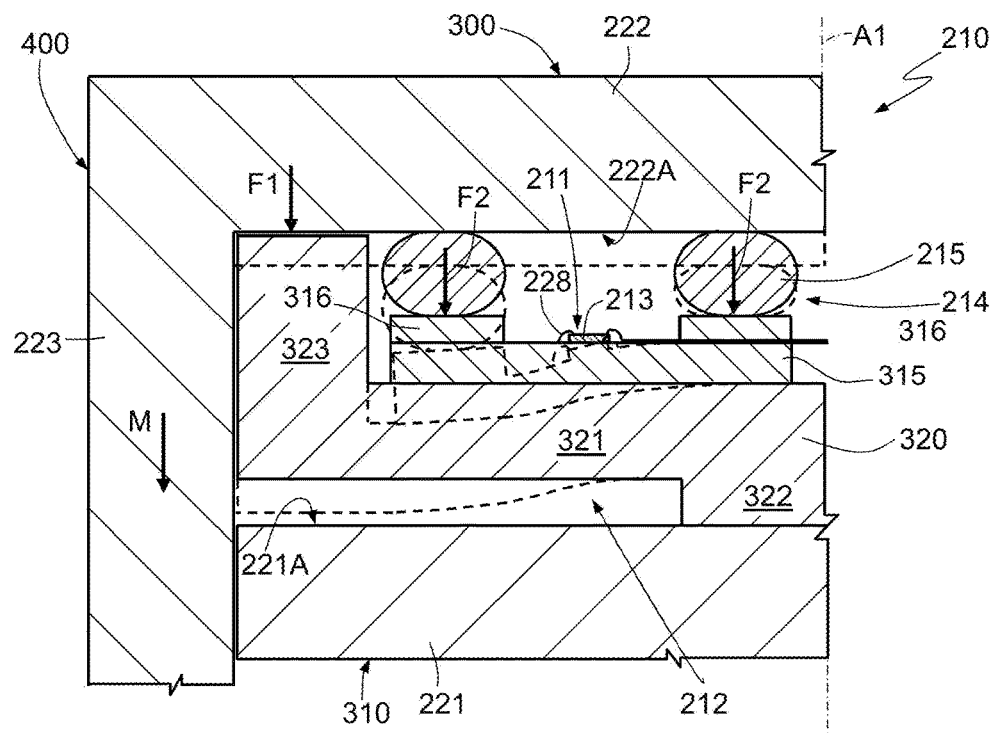
FIGS. 14 and 15 are cross-section views of different embodiments of the present device.

FIG. 14 shows a device 210 arranged between a first part 300 and a second part 310, which may be translated with respect to each other. For example, the two parts 300 and 310 may have a cylindrical shape, be symmetrical with respect to a central axis A1, only half a section whereof being shown in FIG. 14.

In particular, the first part 300 is here formed by a first base 222, of circular shape, and by a cylindrical wall 223. The second part 310 may comprise a second base 221, of circular shape with a diameter substantially equal to the internal diameter of the cylindrical wall 223 to be able to shift therein, parallel to the central axis A1, as indicated by the arrow M. The first base 222 and the second base 221 have respective mutually facing and parallel faces 222A, 221A, which define, together with the cylindrical wall 223, a chamber 214. The faces 222A, 221A here extend perpendicular to the central axis A1.

A cup-shaped washer 320, for example, of steel, is arranged within the chamber 214. The cup-shaped washer 320 comprises a disk-shaped planar portion 321, a central projecting portion 322, extending towards one of the parts 300, 310, here towards the face 221A of the second base 221, and a peripheral projecting portion 323, extending towards the other of the parts 300, 310, here towards the face 222A of the first base 222.

A membrane 315, for example of ceramic and having a circular shape, is in contact with a side of the cup-shaped washer 320, here with the side looking toward the face 222A of the first base 222, eccentrically with respect to the central axis A1 of the device 210. A sensor die 213 is bonded, for example attached via glass frit, to the membrane 315. The membrane 315 may have a thickness of 100 μm so that it may easily warp. The sensor die 213, having a thickness of for example 100 μm, integrates piezoelectric resistors (not shown) and is connected to a processing circuit (not shown, for example an ASIC) through wires 228 and electrical connections (not shown).

Alternatively, the membrane 315 could have screen-printed resistors and be directly connected to the ASIC processing chip.

An annular washer 316, for example of ceramic, rests peripherally on the membrane 315, and an elastic ring or O-Ring 215 is arranged between the annular washer 316 and the face 222A of the first base 222. In a variant, the annular washer 316 may be absent.

Here, the membrane 315, the sensor die 213, and possibly the annular washer 316 form a sensor unit 211. A similar sensor unit may be arranged specularly, to the right of the central axis A1, in a way not shown. Further, the parts 300, 310 and the cup-shaped washer 316 form a package 212 defining the chamber 214 accommodating the sensor unit 211 and the elastic element (elastic ring 215).

In use, a movement M of mutual approach between the two parts 300 and 310 gives rise to a force F1 on the peripheral projecting portion 323 of the cup-shaped washer 320, which deforms, as shown by the dashed line. The elastic ring 215 keeps the membrane 315 in contact with the cup-shaped washer 320, causing a similar deformation of the membrane 315 and of the sensor die 213, which, through its piezoresistors, detects the degree of deformation and thus the applied force.

Figure 15:
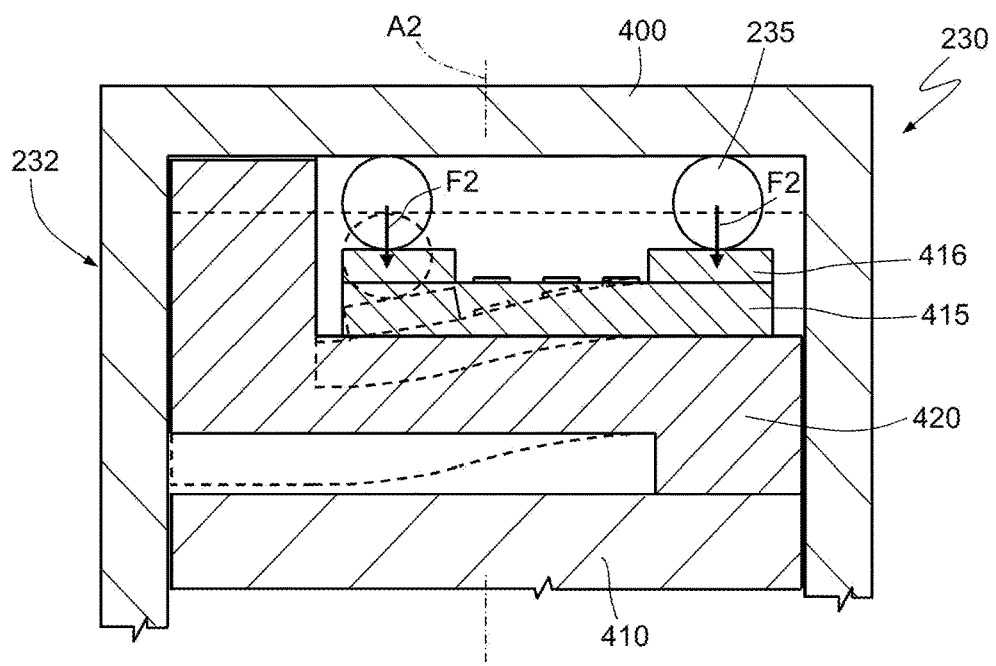

FIG. 15 shows a device 230 operating similarly to FIG. 14, where the two parts 400, 410 are symmetrical with respect to a central axis A2, forming a symmetry axis of the package 232 and extending through the sensor unit 231. Here, the cup-shaped washer 320 is replaced by an S-shaped plate 420, not symmetrical, and piezoresistors 247 are provided on the membrane 415, for example screen-printed resistors.

As in FIG. 14, the device 230 has an annular washer 416, for example of ceramic, resting peripherally on the membrane 415. In addition, an elastic ring 235 is arranged between the annular washer 416 and the first part 400.

The device described herein has many advantages.

In particular, no residual stress arises between the sensor unit and the deformable substrate (base, washer, or die), since the two components are not soldered together. Further, since the sensor unit and the deformable substrate are not soldered together, there are no parts subject to stress concentration. This enables considerable increase of the operating range of the device. Furthermore, in case of temperature gradients, the present device does not undergo stresses due to materials with different expansion characteristics, rigidly constrained together.

Finally, it is clear that modifications and variations may be made to the device described and illustrated herein, without thereby departing from the scope of the present invention, as defined in the attached claims. For example, the various embodiments described may be combined for providing further solutions.

Further, in the solutions wherein a cap is bonded to the sensor die, the ensemble may be replaced by a single semiconductor die, accommodating a buried cavity that delimits a die portion forming a flexible membrane, as known for MEMS cavities. Deflection of the membrane may be detected via piezoresistors integrated in the membrane or via other sensing components operating according to different physical principles, for example in a capacitive way. In this case, the die may be arranged upside down so that the membrane is in contact with the base, membrane, or other deformable substrate, and conductive through vias (for example, the so-called through-silicon vias) may be provided and form electrical connections with the back of the die.

The invention claimed is:

1. A load sensor device, comprising:
   a package forming a chamber and having a lid and a deformable substrate which is, in use, deformed by a force;
   a sensor unit, in direct contact with the deformable substrate, which operates to detect deformations of the deformable substrate; and
   an elastic element arranged within the chamber and acting between the lid and the sensor unit, the elastic element applying, on the sensor unit, a force keeping the sensor unit in contact with the deformable substrate.

2. The device according to claim 1, wherein the sensor unit comprises a sensor die of semiconductor material or ceramic, having a first face in contact with the deformable substrate and carrying deformation sensing elements.

3. The device according to claim 2, wherein the deformation sensing elements are piezoresistors.

4. The device according to claim 2, wherein the sensor die has a second face and a body is arranged between the sensor die and the elastic element, the body having a greater stiffness than the sensor die, wherein the sensor die and the body delimit a gap between them.

5. The device according to claim 1, wherein the elastic element is selected from a group consisting of: a spring element, an elastic ring, and a viscoelastic gel.

6. The device according to claim 1, wherein the elastic element is a strip-shaped or cup-shaped metal lamina.

7. The device according to claim 6, wherein the elastic element further comprises a viscous mass surrounding the sensor unit and arranged between the sensor unit and the package.

8. The device according to claim 7, wherein the viscous mass surrounds at least part of the elastic element.

9. The device according to claim 7, wherein the viscous mass is arranged between the elastic element and the sensor unit.

10. The device according to claim 1, wherein the lid is bonded to a base, the base forming the deformable substrate, and the lid forming a contrast surface for the elastic element.

11. The device according to claim 1, wherein the elastic element is a viscoelastic mass completely filling the chamber.

12. A load sensor device, comprising:
    a package forming a chamber and having a deformable substrate which is, in use, deformed by a force;
    a sensor unit, in direct contact with the deformable substrate, which operates to detect deformations of the deformable substrate; and
    an elastic element arranged within the chamber and acting between the package and the sensor unit, the elastic element applying, on the sensor unit, a force keeping the sensor unit in contact with the deformable substrate;
    wherein the sensor unit comprises a flexible membrane carrying deformation sensing elements, and the elastic element acts between the package and the flexible membrane.

13. The device according to claim 12, comprising a contrast element surrounding the deformation sensing element, and the elastic element is arranged between an inner surface of the package and the contrast element.

14. The device according to claim 12, wherein the elastic element is an elastic ring.

15. A load sensor device, comprising:
    a package forming a chamber and having a deformable substrate configured, in use, to be deformed by a force;
    a sensor unit in direct contact with the deformable substrate and configured to detect deformations of the deformable substrate; and
    an elastic element arranged within the chamber and acting between the package and the sensor unit, the elastic element configured to generate, on the sensor unit, a force keeping the sensor unit in contact with the deformable substrate;
    wherein the elastic element is a shaped plate comprising a peripheral portion, a central portion, and a plurality of arms coupling the peripheral portion to the central portion, wherein the central portion rests on the sensor unit, and the peripheral portion is blocked by the package at a distance from the deformable substrate that is smaller than the height of the sensor unit.

16. The device according to claim 15, wherein the package comprises a lid bonded to the deformable substrate and the peripheral portion is bonded between the lid and the deformable substrate.

17. A load sensor device, comprising:
    a package forming a chamber and having a deformable substrate configured, in use, to be deformed by a force;
    a sensor unit in direct contact with the deformable substrate and configured to detect deformations of the deformable substrate; and
    an elastic element arranged within the chamber and acting between the package and the sensor unit, the elastic element configured to generate, on the sensor unit, a force keeping the sensor unit in contact with the deformable substrate;
    wherein the package comprises a first part and a second part, mobile with respect to each other and defining the chamber, an inner side of the first part forming a contrast surface; the deformable substrate is a non-planar element, having a supporting portion in contact with the sensor unit, a first projecting portion extending towards the first part, and a second projecting portion extending towards the second part; the sensor unit comprises a flexible membrane carrying deformation sensing elements, and the elastic element is arranged between the contrast surface and the sensor unit.

18. The device according to claim 17, wherein the deformable substrate is a cup-shaped washer having a peripheral portion forming the first projecting portion and a central portion forming the second projecting portion, and the elastic element is an elastic ring arranged between the contrast surface and the flexible membrane.

19. The device according to claim 17, wherein the deformable substrate is an S-shaped washer, and the elastic element is an elastic ring arranged between the contrast surface and the flexible membrane.

20. A load sensor device, comprising:
    a package having a deformable base and a lid delimiting a chamber, wherein the deformable base is, in use, deformed by a force to be measured;
    a sensor unit, in direct contact with the deformable base, which operates to detect deformations of the deformable base; and
    an elastic spring element within the chamber, acting between the package and the sensor unit, the elastic spring element applying, on the sensor unit, a force keeping the sensor unit in contact with the deformable substrate.

21. The device according to claim 20, wherein the sensor unit comprises a semiconductor or ceramic material die in direct contact with the deformable substrate, without material interposition, and carrying deformation sensing elements.

22. A load sensor device, comprising:
a deformable substrate which is, in use, deformed by a force;
a cover mounted over the deformable substrate to delimit a chamber;
a sensor unit positioned within the chamber in direct contact with the deformable substrate, the sensor unit operating to detect deformations of the deformable substrate; and
an elastic element arranged within the chamber and acting between the cover and the sensor unit, the elastic element applying, on the sensor unit, a force keeping the sensor unit in contact with the deformable substrate.

23. The device according to claim 22, wherein the sensor unit comprises a sensor die of semiconductor material or ceramic, having a first face in contact with the deformable substrate and carrying deformation sensing elements.

24. The device according to claim 23, wherein the deformation sensing elements are piezoresistors.

25. The device according to claim 23, wherein the sensor die has a second face and a body is arranged between the sensor die and the elastic element, the body having a greater stiffness than the sensor die, wherein the sensor die and the body delimit a gap between them.

26. The device according to claim 22, wherein the elastic element is selected from a group consisting of: a spring element, an elastic ring, and a viscoelastic gel.

27. The device according to claim 22, wherein the elastic element is a strip-shaped or cup-shaped metal lamina.

28. The device according to claim 27, wherein the elastic element further comprises a viscous mass surrounding the sensor unit and arranged between the sensor unit and the cover.

29. The device according to claim 28, wherein the viscous mass surrounds at least part of the elastic element.

30. The device according to claim 28, wherein the viscous mass is arranged between the elastic element and the sensor unit.

31. The device according to claim 22, wherein the cover is bonded to a base, the base forming the deformable substrate, and the cover forms a contrast surface for the elastic element.

32. The device according to claim 22, wherein the sensor unit comprises a flexible membrane carrying deformation sensing elements, and the elastic element acts between the cover and the flexible membrane.

33. The device according to claim 32, comprising a contrast element surrounding the deformation sensing element, and the elastic element is arranged between an inner surface of the cover and the contrast element.

34. The device according to claim 32, wherein the elastic element is an elastic ring.

35. The device according to claim 22, wherein the elastic element is a viscoelastic mass completely filling the chamber.

36. The device according to claim 22, wherein the elastic element is a shaped plate comprising a peripheral portion, a central portion, and a plurality of arms coupling the peripheral portion to the central portion, wherein the central portion rests on the sensor unit.

37. The device according to claim 36, wherein the cover is bonded to the deformable substrate and the peripheral portion is bonded between the cover and the deformable substrate.

* * * * *